(12) United States Patent
Harris (10) Patent No.: US 6,651,373 B2
(45) Date of Patent: Nov. 25, 2003

(54) ICE FISHING DEVICE FOR INCREASING THE EFFECTIVE RADIAL FISHING RANGE BEYOND THE RADIUS OF A FISHING HOLE

(76) Inventor: Gary G. Harris, 620 Tanglewood Rd., Matteson, IL (US) 60443

( * ) Notice: Subject to any disclaimer, the term of this patent is extended or adjusted under 35 U.S.C. 154(b) by 0 days.

(21) Appl. No.: 09/912,985

(22) Filed: Jul. 25, 2001

(65) Prior Publication Data

US 2003/0019143 A1 Jan. 30, 2003

(51) Int. Cl.[7] .............................................. A01K 69/00
(52) U.S. Cl. ............................ 43/4; 43/19.2; 43/26.1
(58) Field of Search ............................ 43/4, 19.2, 26.1, 43/17, 16

(56) References Cited

U.S. PATENT DOCUMENTS

| | | |
|---|---|---|
| 2,122,836 A | 7/1938 | Gegerfeldt |
| 2,972,204 A | 2/1961 | Wollum |
| 3,001,313 A | 9/1961 | Long |
| 3,168,789 A | 2/1965 | Gednalske |
| 3,279,116 A * | 10/1966 | Chapman ........................ 43/23 |
| 3,599,369 A * | 8/1971 | Carlson ......................... 43/17 |
| 3,739,514 A | 6/1973 | Odney |
| 4,718,190 A * | 1/1988 | Ward et al. ..................... 43/17 |
| 4,912,870 A | 4/1990 | Smoluk |
| 5,546,362 A * | 8/1996 | Baumann et al. ........... 367/173 |
| 6,024,318 A * | 2/2000 | Barry ...................... 242/396.9 |
| 6,122,852 A | 9/2000 | Mechling, IV |

* cited by examiner

Primary Examiner—Charles T. Jordan
Assistant Examiner—Joan M. Olszewski
(74) Attorney, Agent, or Firm—Michael R. McKenna (57) ABSTRACT

An ice fishing device for increasing the effective radial fishing range beyond the radius of a fishing hole comprising a fishing rig with a vertical post and a generally horizontal extendable arm. The vertical post moves axially and rotatably relative to the fishing rig and the extendable arm extends radially from the axis of the post for increasing the effective radial fishing range beyond the radius of the fishing hole.

21 Claims, 4 Drawing Sheets

FIG. 5

ICE FISHING DEVICE FOR INCREASING THE EFFECTIVE RADIAL FISHING RANGE BEYOND THE RADIUS OF A FISHING HOLE

BACKGROUND OF THE INVENTION

This invention relates to an ice fishing device for increasing the effective radial fishing range beyond the radius of a fishing hole. Traditional ice fishing is limited to the projected cylinder beneath an ice hole which is typically twelve inches in diameter. Increasing the range in which a fishing hook can be cast enhances the fishing experience and the catch.

This invention allows a fisherman to create the same twelve inch hole and fish over a greater range beyond the twelve inch hole. This is accomplished with a fishing rig that includes an extendable arm that can be positioned under the ice covering pivotally extending from a vertical post, so that a fish hook, that is secured to a fishing line that has been advanced along the post and the extendable arm can be cast over an increased effective radial fishing range beyond the radius of a fishing hole.

The ice fishing device of this useful invention comprises a post, a fishing rig, an extendable arm, and means for controlling the extendable arm. The fishing rig has a stand supported by a plurality of legs. The stand has means for adjustably supporting the post in a vertical position. The means for adjustably supporting allows the post to be moveable axially and rotatably relative to the stand.

The extendable arm has a proximal end and a distal end with the proximal end rotatably connected to a bottom end of the post, and the means for controlling the extendable arm controls it between a first position where the distance between the proximal end and the distal end of the extendable arm is minimal and a second position where the distance between the proximal end and a distal end of the extendable arm is maximal.

Alternative technology is available in the form of a U.S. Pat. No. 3,168,789 issued to Gednalske in 1965 for a fishing rig for ice fishing which allowed for fishing of a continuous circular path at a fixed rate utilizing a joint 32 that is pivotally connecting a vertical section of fishing rod to a transverse section that is normally disposed under the water. The transverse section of the rod, however, is not extendable as is taught by the instant invention. Moreover, the vertical section of the rod does not move axially within its holding sleeve.

See also U.S. Pat. No. 3,001,313 issued in 1960 to Long for an under-ice fishing device which provides for a buoyant member which is rotatable within a frame and moves under the surface of the ice. Also see, see U.S. Pat. No. 4,912,870 issued to Smoluk in 1990 which provides for an ice fishing apparatus with a tripod support.

Additionally, U.S. Pat. No. 2,972,204 issued in 1961 to Wollum for an ice fishing rod for artificial lures discloses a rod for ice fishing having a stand.

The principal disadvantage of such devices is that they do not provide the ability to fish at any point within the extended range. To alleviate this problem, and others which will become apparent from the disclosure which follows, the present invention conveniently allows the extendable arm to extend and rotate, thus allowing a fishing hook on the distal end of the extendable arm to be positionable at an point within a circular ring with an inner diameter equal to the minimal length of the extendable arm and with an outer diameter equal to the maximal length of the extendable arm. Moreover, the extendable arm cam be lowered from a horizontal position to one that is practically vertical, whereby the circular area within the circular ring can be effectively fished as well.

Unlike the foregoing devices, an ice fisherman utilizing the instant invention can control his lure at any point in the area of an enlarged circle. The device can be turned by hand, by an electric motor or a portable drill with portable power supply or powered by a car battery.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Still other advantages will be apparent from the disclosure that follows.

SUMMARY OF THE INVENTION

The invention relates to an ice fishing device for increasing the effective radial fishing range beyond the radius of a fishing hole which comprises a post, a fishing rig, an extendable arm, and means for controlling the extendable arm. Means for adjustably supporting allows the post to allow it to move axially and rotatably relative to the fishing rig. The extendable arm has a proximal end and a distal end with the proximal end rotatably connected to a bottom end of the post, and the means for controlling the extendable arm controls it between a first position where the distance between the proximal end and the distal end of the extendable arm is minimal and a second position where the distance between the proximal end and a distal end of the extendable arm is maximal.

In the ice fishing device for increasing the effective radial fishing range beyond the radius of a fishing hole as described, the bottom end of the post that is supported vertically can be lowered into the fishing hole of an ice covering, the distal end of the extendable arm can be disposed between the first position and the second position, the post can be rotated about its vertical axis, and a fish hook, that is secured to a fishing line that has been advanced along the post and the extendable arm and through a first eyelet disposed on the distal end of the extendable arm, can be cast in an increased effective radial fishing range beyond the radius of a fishing hole.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Preferred embodiments of the invention are described hereinafter with reference to the accompanyin drawing wherein.

DETAILED DESCRIPTION OF THE INVENTION

Without departing from the generality of the invention disclosed herein and without limiting the scope of the invention, the discussion that follows, will refer to the invention as depicted in the drawing.

Figure 1:
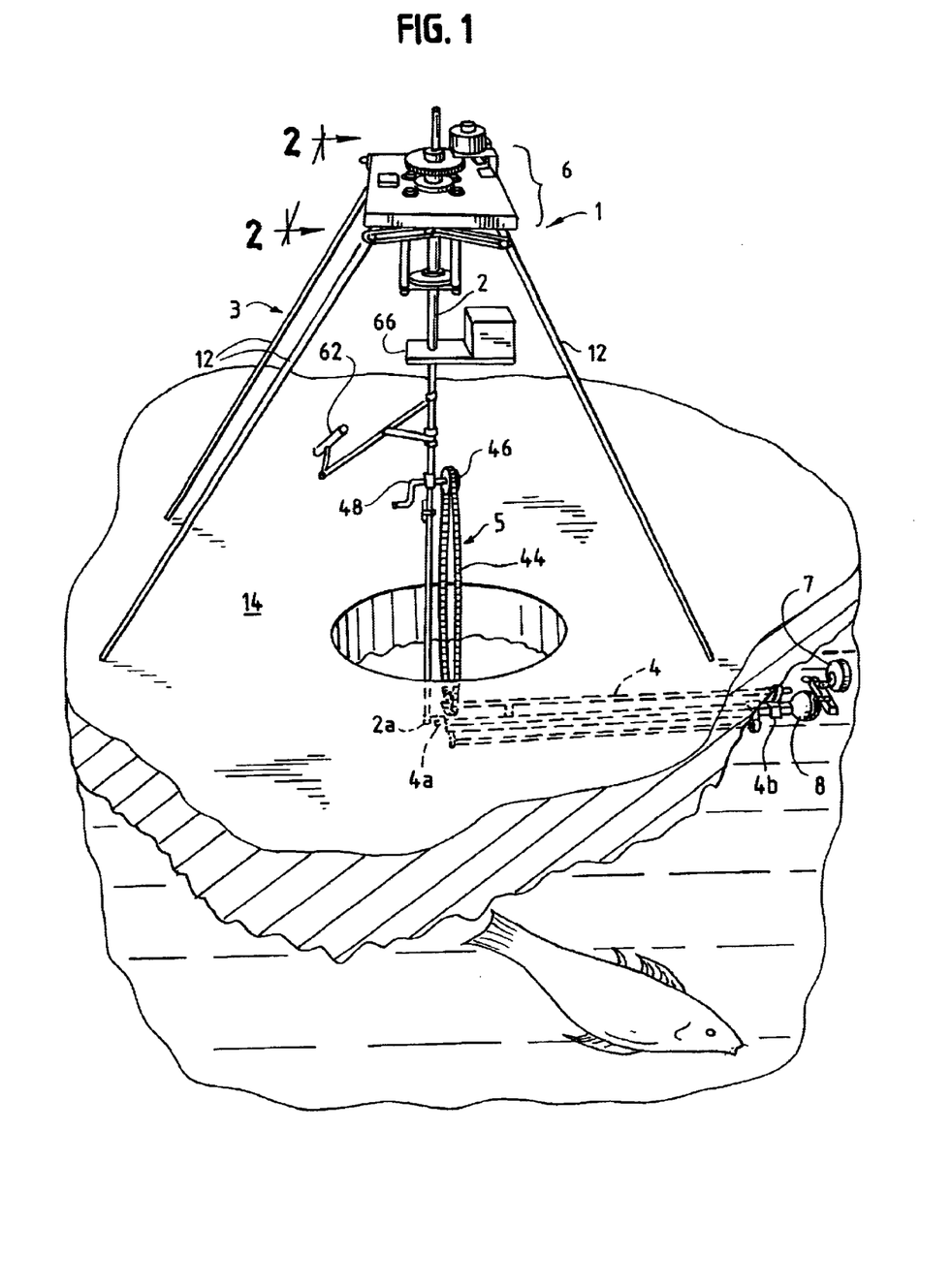
FIG. 1 is a perspective view of an ice fishing device for increasing the effective radial fishing range beyond the radius of a fishing hole of the present invention showing a stand supported by a plurality of legs holding a vertical post which has an extendable arm pivotally connected to a bottom end of the post.
Figure 2:
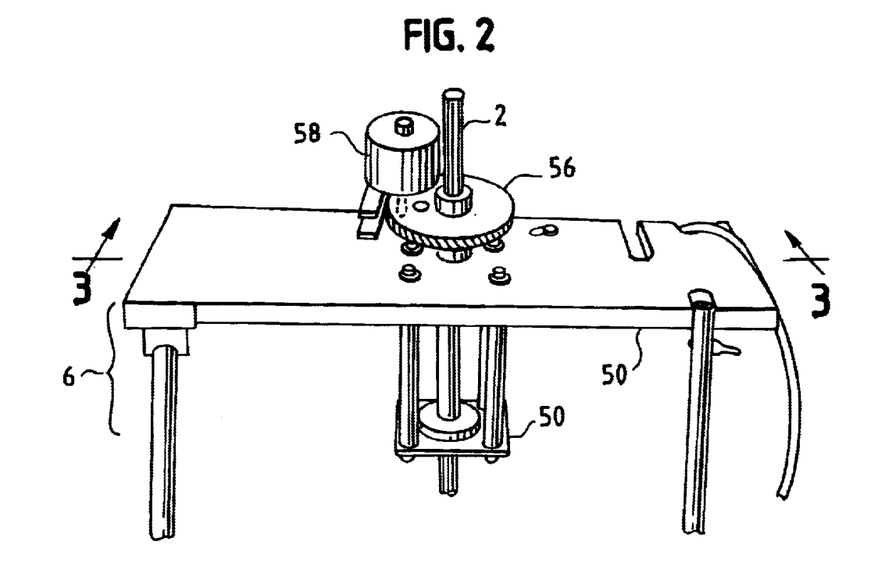
FIG. 2 is a perspective view of the stand of an ice fishing device of the present invention showing a pair of spaced surfaces that are fixed relative to one another in which the post can be supported.
Figure 3:
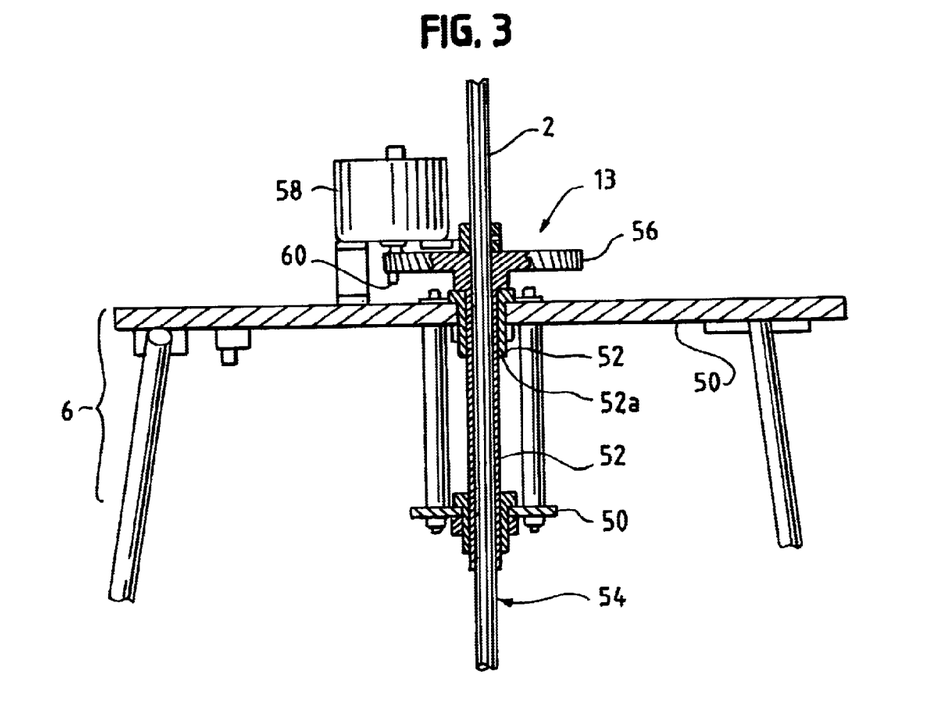
FIG. 3 is a side elevation view of the post and stand of an ice fishing device of the present invention showing the pair of spaced surfaces, a vertical sleeve in which the post can be supported and a motorized gear driven means for rotating the sleeve and the post of the present invention.

The preferred embodiments of the apparatus depicted in the drawing show an ice fishing device 1 for increasing the effective radial fishing range beyond the radius of a fishing hole 11 comprises a post 2, a fishing rig 3, an extendable arm 4, and means for controlling the extendable arm 5. The fishing rig has a stand 6 supported by a plurality of legs 12, as shown in FIG. 1. Referring to FIGS. 2–3, the stand 6 has means for adjustably supporting 13 the post in a vertical position. The means for adjustably supporting 13 allows the post 2 to be moveable axially and rotatably relative to the stand 6.

Figures 6, 9:
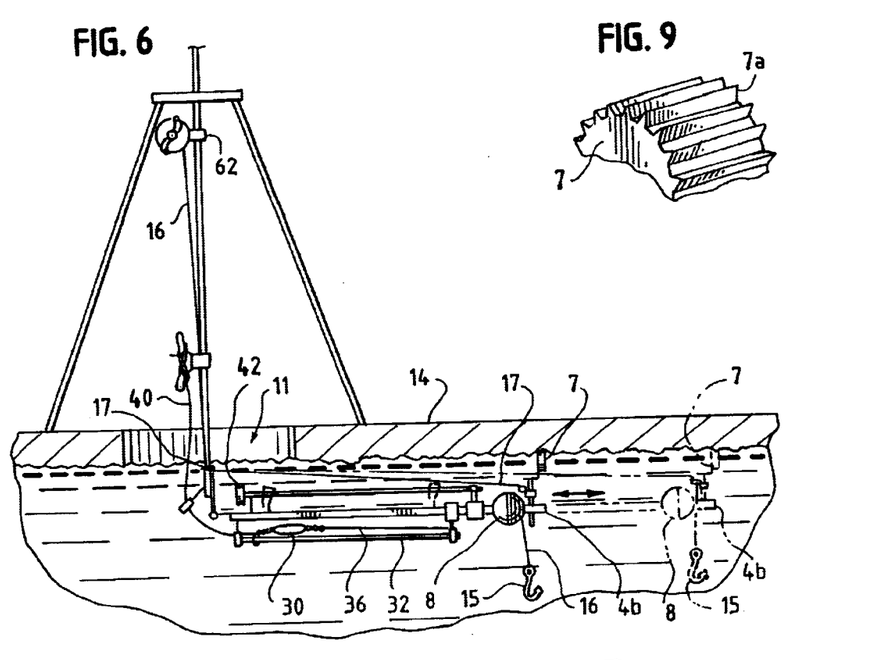
FIG. 6 is a side elevation schematic view of the fishing device of the current invention showing the support legs resting on an ice covering and the post disposed through an ice hole in the ice covering with the extendable arm disposed in the water under the ice covering and a wheel for traversing the underside of the ice covering, and further showing in phantom the extendable arm in its extended position.
FIG. 9 is a fragmentary side elevation view of the wheel disposed on the distal end of the extendable arm showing its radially extending teeth.

The extendable arm 4 has a proximal end 4a and a distal end 4b with the proximal end rotatably connected to a bottom end 2a of the post 2, and the means for controlling 5 the extendable arm 4 controls it between a first position where the distance between the proximal end and the distal end of the extendable arm is minimal, as illustrated in FIG. 6, and a second position where the distance between the proximal end and a distal end of the extendable arm is maximal (shown in phantom in FIG. 6).

In the ice fishing device for increasing the effective radial fishing range beyond the radius of a fishing hole as described, the bottom end 2a of the post that is supported vertically can be lowered into the fishing hole 11 of an ice covering 14, the distal end 4b of the extendable arm 4 can be disposed between the first position and the second position, the post 2 can be rotated about its vertical axis, and a fish hook 15, that is secured to a fishing line 16 that has been advanced along the post and the extendable arm and through a first eyelet 17 disposed on the distal end 4b of the extendable arm, can be cast in an increased effective radial fishing range beyond the radius of the fishing hole.

Figure 4:
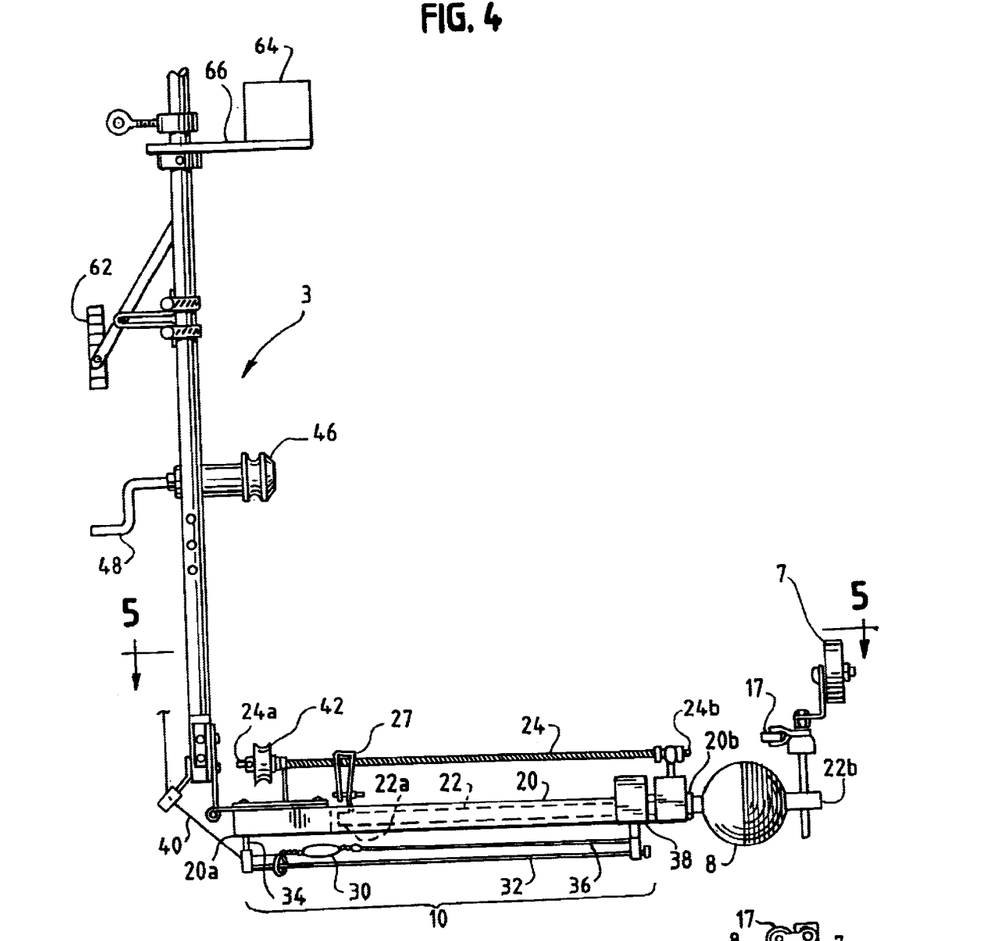
FIG. 4 is a side elevation view of the post pivotally connected to the proximate end of the extendable arm and showing means for controlling the extendable arm and a bobber as a means for flotation.
Figure 5:
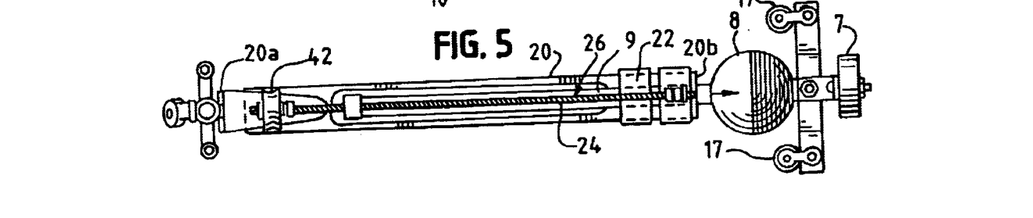
FIG. 5 is a top plan view of the fishing device of the current invention taken along the line 5—5 of FIG. 4, showing further details of the extendable arm and means for controlling the extendable arm.

The ice fishing device may further comprise means for maintaining the extendable arm 4 in a horizontal position. As best shown in FIG. 4, the means for maintaining the extendable arm in a horizontal position comprises at least one wheel 7 disposed proximate the distal end 4b of the extendable arm. The at least one wheel is rotatable about a wheel axis that is parallel to a centerline of the extendable arm 4, and the at least one wheel may have radially extending teeth 7a, as shown in FIG. 9, of sufficient height to traverse a rough undersurface of the ice covering 14. As delineated, the at least one wheel 7 can traverse any one of a plurality of arcs on the rough undersurface of the ice covering 14 as the post 2 is rotated about its vertical axis and the extendable arm 4 is varied in length.

The means for maintaining the extendable arm in a horizontal position may comprise any of the known alternative ways of maintaining the pivotally extendable arm in a horizontal position, such as, but not limited to, an arm extending from the vertical post which limits the pivoting movement of the extendable arm so that the distal end of the extendable arm is at or below a horizontal plane passing through the proximal end 4a of the extendable arm.

Figures 7, 8:
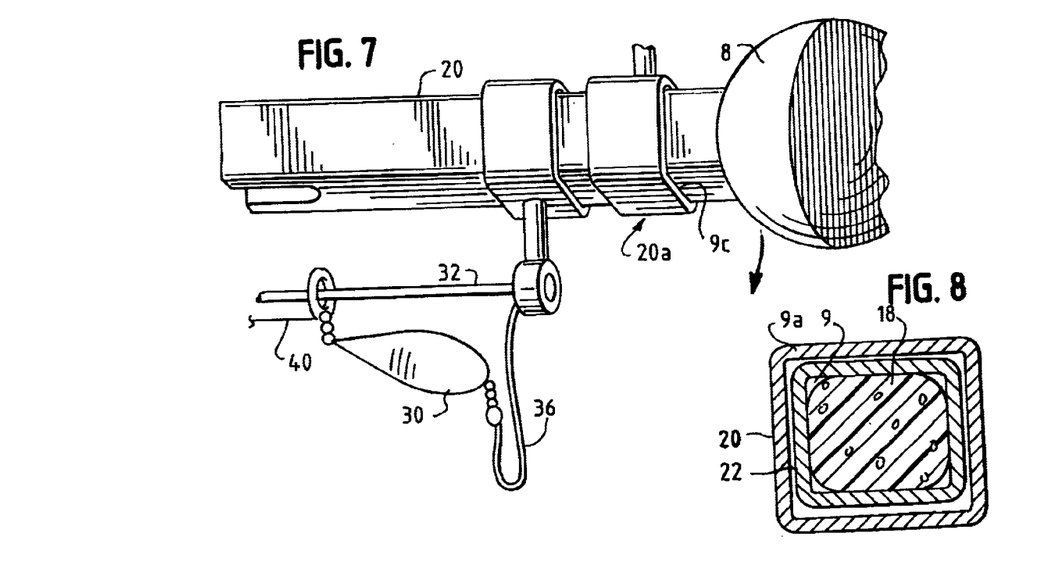
FIG. 7 is a perspective view of the distal end of the extendable arm of the ice fishing device of the present invention showing the counterbalancing means for lowering the distal end of the extendable arm.
FIG. 8 is a cross sectional view of the extendable arm showing the rectangular cross section of the outer sleeve and a rectangular cross section of the inner neck and the means for flotation disposed in a cavity in the neck.

Referring to FIG. 4, the means for maintaining the extendable arm in a horizontal position may comprise a means for floatation 8 disposed at the distal end 4b of the extendable arm 4. Optionally, the means for floatation 8 can be disposed in a cavity 9 in the extendable arm, as shown in FIG. 8. Alternatively, the means for floatation may comprise a bobber. A suitable quantity of floatable plastic foam 18 could be used as the material for the means for floatation 8.

In a preferred embodiment of the ice fishing device of this important invention means for overriding the means for maintaining are provided to lower the distal end 4b of the extendable arm 4 below a horizontal plane passing through the proximal end 4a of the extendable arm so that the extendable arm can be more easily removed from the ice hole. Said means for overriding may comprise a counterbalance 10, that is moveable along the extendable arm 4. Means for moving the counterbalance 10 between a primary position, shown in FIG. 4, at which the counterbalance has minimal effect on the means for floatation 8 and a secondary position, shown in FIG. 7, at which the counterbalance overrides the means for floatation may also be provided so that the distal end 4b of the extendable arm will rotate downwardly (in the direction of the arrow in FIG. 7) and can be more easily removed from the ice hole.

Preferably, the extendable arm 4 comprises an elongated outer sleeve 20 having a proximal end 20a and a distal end 20b with an inner cavity 9a and an elongated inner neck 22 that slidably extends from the inner cavity 9a proximate the distal end 20b thereof. The inner neck 22 has a proximal end 22a and a distal end 22b and the means for controlling the extendable arm comprises a threaded rod 24 having a proximal end 24a and a distal end 24b and an elongated opening 26 disposed longitudinally on a wall of the outer sleeve 20, and an elongated inner neck 22 that slidably extends from said cavity 9a through an opening 9c proximate the distal end 4b thereof The inner neck 22 has a proximal end 22a and a distal end 22b. Additionally, the means for controlling the extendable arm comprises a threaded rod 24 having a proximal end 24a and a distal end 24b, each of which is supported from the outer sleeve 20, an internally threaded means 27 that is fixedly connected to the inner neck 22 and extending through the elongated opening 26 oft he outer sleeve 20 with the internally threaded means 27 being in operative association with the threaded rod 24.

Upon a first rotation of the threaded rod 24 through the internally threaded means 27, the internally threaded means 27 and the inner neck 22 fixedly connected thereto moves distally toward the second position of the extendable arm 4 thereby extending the extendable arm. Upon a reverse rotation of the threaded rod 24, the internally threaded means 27 and the inner neck 22 move proximally toward the first position of the extendable arm 4.

In another preferred embodiment of the ice fishing device 1 for increasing the effective radial fishing range beyond the radius of a fishing hole, the means for maintaining the extendable arm in a horizontal position may comprise a means for floatation 8 disposed at the distal end 4b of the extendable arm 4, and means for overriding the means for maintaining to lower the distal end 4b of the extendable arm 4 below a horizontal plane passing through the proximal end 4a of the extendable arm so that the extendable arm can be more easily removed from the ice fishing hole 11. The means for overriding may include a counterbalance 10 and means for moving the counterbalance.

The counterbalance may comprise a lead weight 30 suspended from an auxiliary rod 32 that extends toward the distal end 20a of the outer sleeve from a first point 34 proximate the proximal end 20a of the outer sleeve 20, and said means for moving the counterbalance may comprise a resilient member 36 attached between the lead weight 30 and a second point 38 proximate the distal end 20b of the outer sleeve for moving the lead weight toward the distal end of the outer sleeve and a string 40 extending from the lead weight toward the proximal end 20a of the outer sleeve and up along the post 2 for opposing movement of the lead weight 30 toward the distal end 20b of the outer sleeve, as shown in FIG. 4.

Preferably, as shown in FIG. 8, the cross-section of the inner cavity 9a of the elongated outer sleeve 20 and the cross-section of the inner neck 22 are each rectangular and sufficiently sized relative to one another to preclude rotation of the inner neck within the outer sleeve, thereby maintaining the position of the first eyelet 17 relative to the outer sleeve 20 so as to reduce entanglement of the fishing line 16.

Another enhanced aspect of the ice fishing device 1 of the present invention, as shown in FIGS. 1 and 4, includes a pulley 42 fixedly connected to the threaded rod 24 and a drive belt 44 operably connected to the pulley 42 and a means for driving the belt, with the means for driving the belt being attached to the fishing rig. The means for driving the belt may comprise an upper pulley 46 and a crank 48 operably connected to the upper pulley.

As best shown in FIGS. 2 and 3, the stand 6 may comprise a pair of spaced surfaces 50 that are fixed relative to one another and each of the pair of spaced surfaces has an opening in which the post can be disposed, and with the means for adjustably supporting the post 2 comprises a vertical sleeve 52 within which the post can move axially. The post has external means for rotatively coupling 54 with an inner surface 52a of said vertical sleeve and the vertical sleeve 52 is rotatably supported by at least one of said pair of spaced surfaces 50. In this way, the post can be rotated to rotate the vertical sleeve and said post can be moved axially relative to said vertical sleeve.

Preferably, the ice fishing device for increasing the effective radial fishing range beyond the radius of a fishing hole has the means for adjustably supporting the post further including a rotation gear 56 attached to the post 2 and an electric motor 58 with a drive gear 60 adapted to engage and drive the rotation gear 56. Upon supplying power to the electric motor 58, the drive gear 60 can engage the rotation gear 56 to rotate the post 2 and the extendable arm 4 to cause the fish hook 15 to move in one of a plurality of circular arcs about the fishing hole 11. Obviously, the rotation gear 56 could be engaged to the vertical sleeve and the post thereby rotated relative to the stand.

Referring to FIG. 4, the ice fishing device of this invention may further comprise a fishing rod holder 62 attached to the fishing rig 3. Additionally, a depth finder 64 and a holder 66 for the depth finder may be provided with the holder being attached to the fishing rig. Alternatively, measuring indicia may be disposed on the vertical post to provide a ready reference for the depth of the extendable arm. Similarly, measuring indicia may be associated with the means for controlling the extendable arm to provide a fisherman with an indication of the length of the extendable arm.

In another preferred embodiment of the ice fishing device for increasing the effective radial fishing range beyond the radius of a fishing hole includes a post 2, a fishing rig 3, an extendable arm 4, means for controlling 5 the extendable arm, means for maintaining the extendable arm in a horizontal position, and means for overriding the means for maintaining are included. The fishing rig 3 has a stand 6 supported by a plurality of legs 12.

The stand 6 has means for adjustably supporting the post in a vertical position, whereby the post 2 is moveable axially and rotatably relative to the stand 6. The extendable arm 4 has a proximal end and a distal end with the proximal end rotatably connected to a bottom end 2a of the post. The means for controlling the extendable arm directs the extendable arm between a first position where the distance between the proximal end and the distal end of the extendable arm is minimal and the second position where the distance between the proximal end and a distal end of the extendable arm is maximal.

The means for maintaining the extendable arm in a horizontal position comprises a means for floatation 8 disposed at the distal end 4b of the extendable arm.

The means for overriding the means for maintaining is provided to lower the distal end 4b of the extendable arm below a horizontal plane passing through the proximal end 4a of the extendable arm so that the extendable arm can be more easily removed from the ice hole. The means for overriding comprises a counterbalance 10, that is moveable along the extendable arm 4, and means for moving the counterbalance between a primary position at which the counterbalance has minimal effect on the means for floatation and a secondary position at which the counterbalance overrides the means for floatation so that the extendable arm can be more easily removed from the ice hole. In this way, the bottom end 2a of the post that is supported vertically can be lowered into the fishing hole of an ice covering 14, the distal end 4b of the extendable arm can be disposed between the first position and the second position, the post 2 can be rotated about its vertical axis, and a fish hook 15, that is secured to a fishing line 16 that has been advanced along the post and the extendable arm and through a first eyelet 17 disposed on the distal end 4b of the extendable arm, can be cast in an increased effective radial fishing range beyond the radius of a fishing hole 11.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is base, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

My invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ice fishing device for increasing the effective radial fishing range beyond the radius of a fishing hole comprising:
    a. a post;
    b. a fishing rig having a stand supported by a plurality of legs,
        i. said stand having means for adjustably supporting the post in a vertical position, whereby the post is moveable axially and rotatably relative to the stand;
    c. an extendable arm having a proximal end and a distal end with the proximal end rotatably connected to a bottom end of the post; and
    d. means for controlling the extendable arm between a first position where the distance between the proximal end and the distal end of the extendable arm is minimal and a second position where the distance between the proximal end and a distal end of the extendable arm is maximal,
        whereby, the bottom end of the post that is supported vertically can be lowered into the fishing hole of an ice covering, the distal end of the extendable arm can be disposed between the first position and the second position, the post can be rotated about its vertical axis, and a fish hook, that is secured to a fishing line that has been advanced along the post and the extendable arm and through a first eyelet disposed on the distal end of the extendable arm, can be cast in an increased effective radial fishing range beyond the radius of a fishing hole.

2. The ice fishing device for increasing the effective radial fishing range beyond the radius of a fishing hole of claim 1, further comprising means for maintaining the extendable arm in a horizontal position.

3. The ice fishing device for increasing the effective radial fishing range beyond the radius of a fishing hole of claim 2, wherein the means for maintaining the extendable arm in a horizontal position comprises at least one wheel disposed proximate the distal end of the extendable arm, said at least one wheel being rotatable about a wheel axis that is parallel to a centerline of the extendable arm,
    whereby the at least one wheel can traverse any one of a plurality of arcs on an undersurface of the ice covering as the post is rotated about its vertical axis and the extendable arm is varied in length.

4. The ice fishing device for increasing the effective radial fishing range beyond the radius of a fishing hole of claim 3, wherein the at least one wheel has radially extending teeth of sufficient height to traverse a rough undersurface of the ice covering,
    whereby the at least one wheel can traverse any one of a plurality of arcs on the rough undersurface of the ice covering as the post is rotated about its vertical axis and the extendable arm is varied in length.

5. The ice fishing device for increasing the effective radial fishing range beyond the radius of a fishing hole of claim 1, wherein the means for maintaining the extendable arm in a horizontal position comprises a means for floatation disposed at the distal end of the extendable arm.

6. The ice fishing device for increasing the effective radial fishing range beyond the radius of a fishing hole of claim 5, wherein the means for floatation is disposed in a cavity in the extendable arm.

7. The ice fishing device for increasing the effective radial fishing range beyond the radius of a fishing hole of claim 5, wherein the means for floatation comprises a bobber.

8. The ice fishing device for increasing the effective radial fishing range beyond the radius of a fishing hole of claim 5, wherein the means for floatation comprises a suitable quantity of floatable plastic foam.

9. The ice fishing device for increasing the effective radial fishing range beyond the radius of a fishing hole of claim 2, further comprising means for overriding the means for maintaining to lower the distal end of the extendable arm below a horizontal plane passing through the proximal end of the extendable arm so that the extendable arm can be more easily removed from the ice hole.

10. The ice fishing device for increasing the effective radial fishing range beyond the radius of a fishing hole of claim 9, wherein the means for overriding comprises a counterbalance, that is moveable along the extendable arm, and means for moving the counterbalance between a primary position at which the counterbalance has minimal effect on the means for floatation and a secondary position at which the counterbalance overrides the means for floatation so that the extendable arm can be more easily removed from the ice hole.

11. The ice fishing device for increasing the effective radial fishing range beyond the radius of a fishing hole of claim 1, wherein the extendable arm comprises an elongated outer sleeve having a proximal end and a distal end with an inner cavity, and an elongated inner neck that slidably extends from said cavity through an opening proximate the distal end thereof.

12. The ice fishing device for increasing the effective radial fishing range beyond the radius of a fishing hole of claim 11, wherein the extendable arm comprises an elongated opening disposed longitudinally on a wall of the outer sleeve, and wherein the means for controlling the extendable arm comprises a threaded rod having a proximal end and a distal end, each of which is supported from the outer sleeve, an internally threaded means being fixedly connected to the inner neck outer sleeve and extending through the elongated opening of the outer sleeve, said internally threaded means being in operative association with the threaded rod, whereby, upon a first rotation of the threaded rod through the internally threaded means, the internally threaded means and the inner neck fixedly connected thereto moves distally toward the second position of the extendable arm thereby extending the extendable arm, and upon a reverse rotation of the threaded rod, the internally threaded means and the inner neck move proximally toward the first position of the extendable arm.

13. The ice fishing device for increasing the effective radial fishing range beyond the radius of a fishing hole of claim 11, wherein the means for maintaining the extendable arm in a horizontal position comprises a means for floatation disposed at the distal end of the extendable arm; and further comprising means for overriding the means for maintaining to lower the distal end of the extendable arm below a horizontal plane passing through the proximal end of the extendable arm so that the extendable arm can be more easily removed from the ice hole, said means for overriding including a counterbalance and means for moving the counterbalance, said counterbalance comprises a lead weight suspended from an auxiliary rod that extends toward the distal end of the outer sleeve from a first point proximate the proximal end of the outer sleeve, and said means for moving the counterbalance comprises a resilient member attached between the lead weight and a second point proximate the distal end of the outer sleeve for moving the lead weight toward the distal end of the outer sleeve and a string extending from the lead weight toward the proximal end of the outer sleeve and up along the post for opposing movement of the lead weight toward the distal end of the outer sleeve.

14. The ice fishing device for increasing the effective radial fishing range beyond the radius of a fishing hole of claim 11, wherein cross-section of the inner cavity of the elongated outer sleeve and the cross-section of the inner neck are each rectangular and sufficiently sized relative to one another to preclude rotation of the inner neck within the outer sleeve, thereby maintaining the position of the first eyelet relative to the outer sleeve so as to reduce entanglement of the fishing line.

15. The ice fishing device for increasing the effective radial fishing range beyond the radius of a fishing hole of claim 12, further comprising a pulley fixedly connected to the threaded rod and a drive belt operably connected to the pulley and a means for driving the belt, said means for driving the belt being attached to the fishing rig.

16. The ice fishing device for increasing the effective radial fishing range beyond the radius of a fishing hole of claim 15, wherein the means for driving the belt comprises an upper pulley and a crank operably connected to the upper pulley.

17. The ice fishing device for increasing the effective radial fishing range beyond the radius of a fishing hole of claim 1, wherein the stand comprises a pair of spaced surfaces that are fixed relative to one another and each of said pair of spaced surfaces has an opening in which the post is disposed; and wherein with the means for adjustably supporting the post comprises a vertical sleeve within which the post can move axially, said post having external means for rotatively coupling with an inner surface of said vertical sleeve, said vertical sleeve being rotatably supported by at least one of said pair of spaced surfaces, whereby, the post can be rotated to rotate the vertical sleeve and said post can be moved axially relative to said vertical sleeve.

18. The ice fishing device for increasing the effective radial fishing range beyond the radius of a fishing hole of claim 17, wherein with the means for adjustably supporting the post further comprises a rotation gear attached to the post and an electric motor with a drive gear adapted to engage and drive the rotation gear, whereby, upon supplying power to the electric motor, the drive gear engages the rotation gear to rotate the post and the extendable arm to cause the fish hook to move in one of a plurality of circular arcs about the fishing hole.

19. The ice fishing device for increasing the effective radial fishing range beyond the radius of a fishing hole of claim 1, further comprising a fishing rod holder attached to the fishing rig.

20. The ice fishing device for increasing the effective radial fishing range beyond the radius of a fishing hole of claim 1, further comprising a depth finder and a holder for said depth finder, said holder being attached to the fishing rig.

21. An ice fishing device for increasing the effective radial fishing range beyond the radius of a fishing hole comprising:

a. a post;
b. a fishing rig having a stand supported by a plurality of legs,
   i. said stand having means for adjustably supporting the post in a vertical position, whereby the post is moveable axially and rotatably relative to the stand;
c. an extendable arm having a proximal end and a distal end with the proximal end rotatably connected to a bottom end of the post;
d. means for controlling the extendable arm between a first position where the distance between the proximal end and the distal end of the extendable arm is minimal and the second position where the distance between the proximal end and a distal end of the extendable arm is maximal;

e. means for maintaining the extendable arm in a horizontal position,
   i. said means for maintaining the extendable arm in a horizontal position comprises a means for floatation disposed at the distal end of the extendable arm;
f. means for overriding the means for maintaining to lower the distal end of the extendable arm below a horizontal plane passing through the proximal end of the extendable arm so that the extendable arm can be more easily removed from the ice hole,
   i. said means for overriding comprises a counterbalance, that is moveable along the extendable arm, and means for moving the counterbalance between a primary position at which the counterbalance has minimal effect on the means for floatation and a secondary position at which the counterbalance overrides the means for floatation so that the extendable arm can be more easily removed from the ice hole, whereby, the bottom end of the post that is supported vertically can be lowered into the fishing hole of an ice covering, the distal end of the extendable arm can be disposed between the first position and the second position, the post can be rotated about its vertical axis, and a fish hook, that is secured to a fishing line that has been advanced along the post and the extendable arm and through a first eyelet disposed on the distal end of the extendable arm, can be cast in an increased effective radial fishing range beyond the radius of a fishing hole.

* * * * *